United States Patent
Majumder

(12) 
(10) Patent No.: US 10,614,394 B2
(45) Date of Patent: Apr. 7, 2020

(54) DATA ANALYTICS MODEL SELECTION THROUGH CHAMPION CHALLENGER MECHANISM

(71) Applicant: Dell Products, LP, Round Rock, TX (US)

(72) Inventor: Prabir Majumder, Plano, TX (US)

(73) Assignee: Dell Products, L.P., Round Rock, TX (US)

( * ) Notice: Subject to any disclaimer, the term of this patent is extended or adjusted under 35 U.S.C. 154(b) by 960 days.

(21) Appl. No.: 14/936,281

(22) Filed: Nov. 9, 2015

(65) Prior Publication Data

US 2017/0132548 A1    May 11, 2017

(51) Int. Cl.
   - *G06Q 10/06* (2012.01)
   - *G06Q 10/08* (2012.01)
   - *G06N 20/00* (2019.01)

(52) U.S. Cl.
   CPC ....... *G06Q 10/06315* (2013.01); *G06N 20/00* (2019.01); *G06Q 10/067* (2013.01); *G06Q 10/087* (2013.01)

(58) Field of Classification Search
   None
   See application file for complete search history.

(56) References Cited

U.S. PATENT DOCUMENTS

| | | | |
|---|---|---|---|
| 8,700,607 B2 | 4/2014 | Maag | |
| 2005/0189415 A1* | 9/2005 | Fano | G06N 20/00 235/383 |
| 2008/0314981 A1* | 12/2008 | Eisenson | G06Q 10/087 235/385 |
| 2009/0327033 A1* | 12/2009 | Rai | G06Q 10/087 705/7.31 |
| 2011/0173144 A1* | 7/2011 | Shan | G06N 20/00 706/13 |
| 2012/0005070 A1 | 1/2012 | McFall et al. | |
| 2014/0200992 A1* | 7/2014 | Wang | G06Q 30/0246 705/14.45 |
| 2014/0289006 A1 | 9/2014 | Palmer et al. | |

* cited by examiner

*Primary Examiner* — Kurtis Gills
*Assistant Examiner* — Akosua Kyereme-Tuah
(74) *Attorney, Agent, or Firm* — Larson Newman, LLP

(57) ABSTRACT

A method for forecasting includes obtaining input data from a data store, using a processor to forecast future data with a currently selected model, detecting a trigger event using a processor, training alternative models in a model family or from multiple families on the input data based on detecting in response to detecting the trigger event, identifying a replacement model from the alternative models using a processor, and using a processor to forecast future data with the replacement model.

14 Claims, 3 Drawing Sheets

DATA ANALYTICS MODEL SELECTION THROUGH CHAMPION CHALLENGER MECHANISM

FIELD OF THE DISCLOSURE

The present disclosure generally relates to information handling systems, and more particularly relates to data analytics model selection through a champion challenger mechanism.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
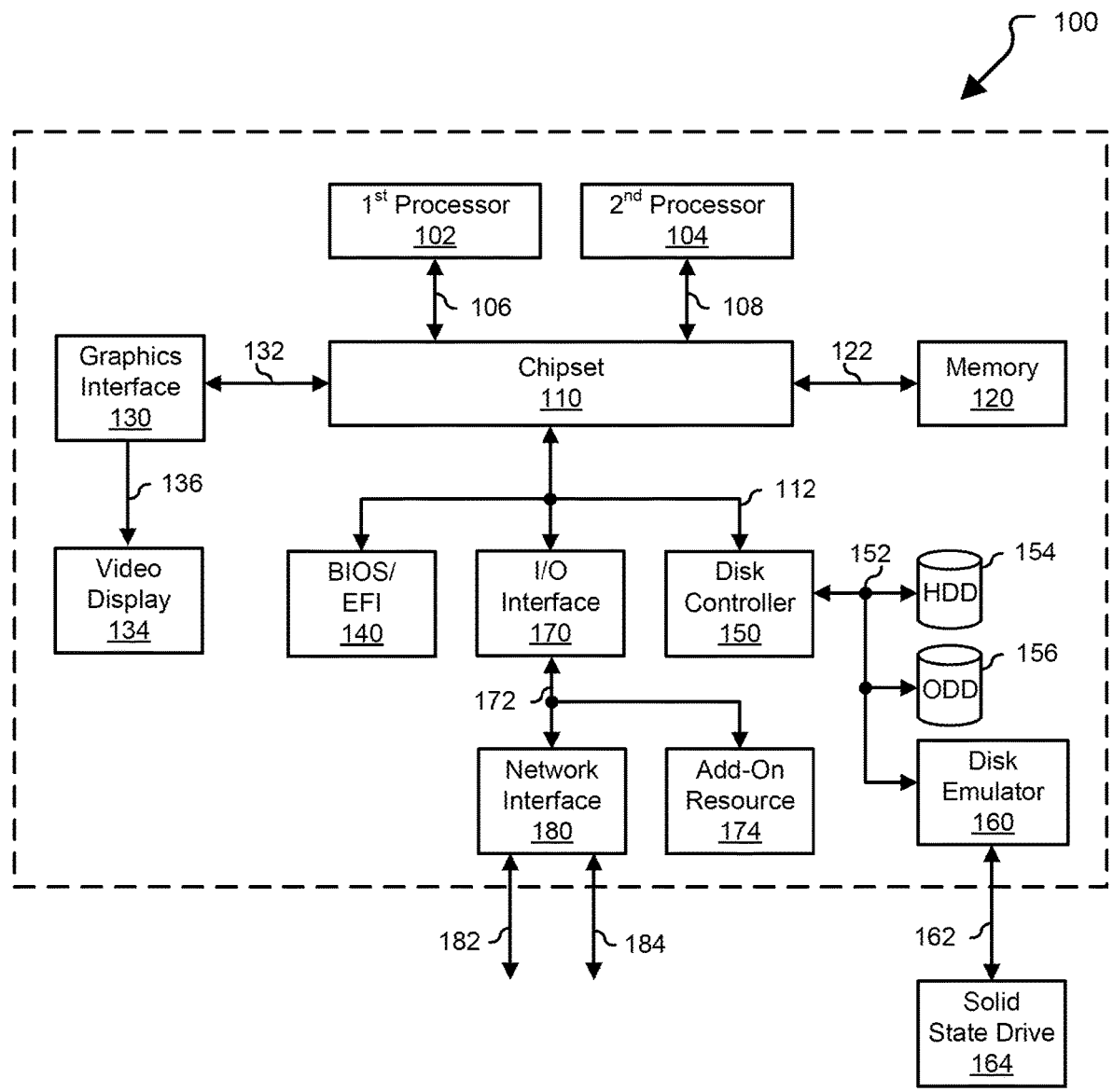
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1134 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
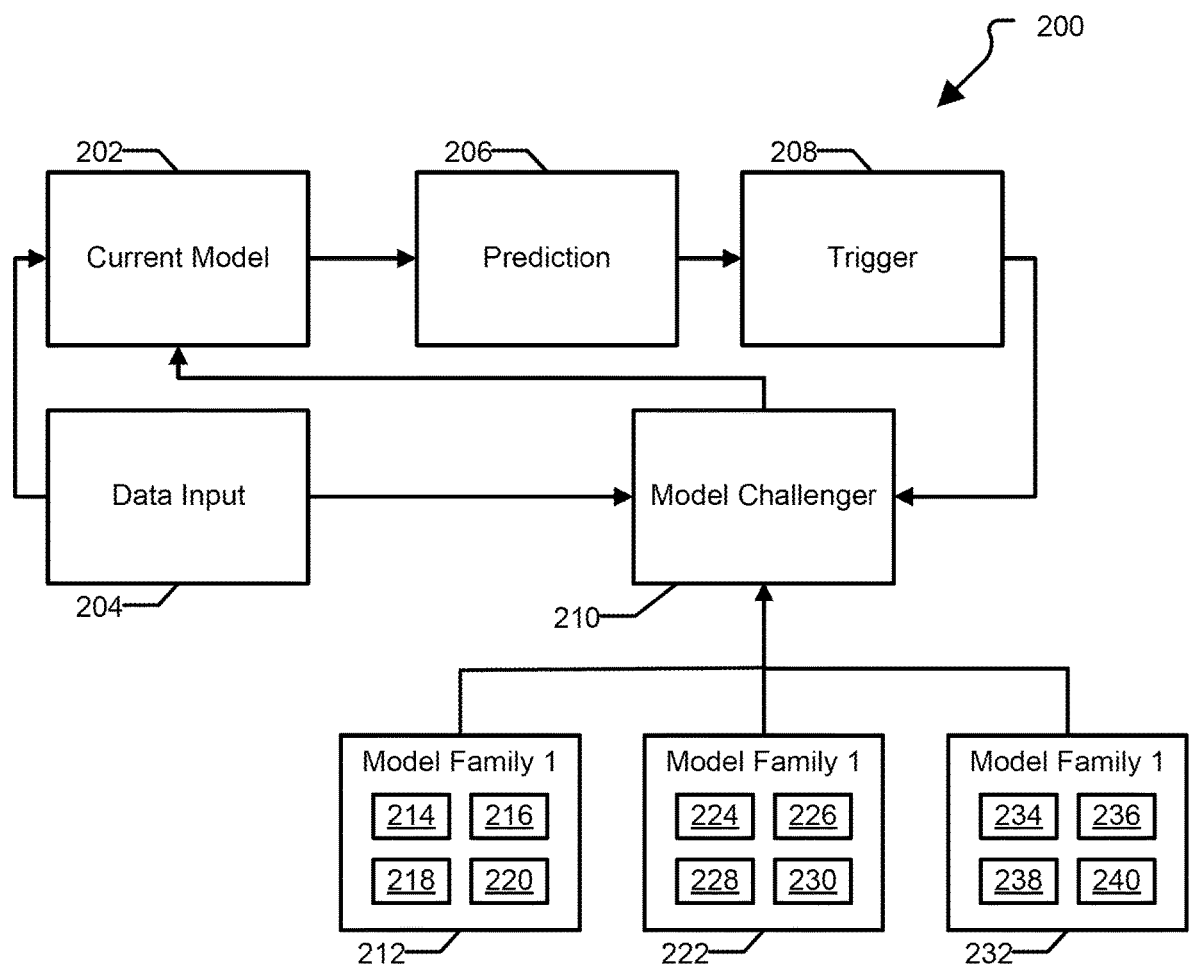
FIG. 2 is a block diagram illustrating an exemplary system for model selection.

FIG. 2 shows a system 200 for data analytics. System 200 utilizes current model 202 to process data input 204 to generate a prediction 206. In various embodiments, current model 202 can be trained on a first subset of data input 204, while a more recent subset of data input 204 is held back for testing and validating the prediction. Additionally, the current model 202 can predict future values and further trends in the data input 204 when utilizing the complete data set included in data input 204.

A trigger 208 can be activated under certain circumstances based on the prediction 206. In various embodiments, the trigger 208 may be activated based on correlations the data input 204 and the expected results based on predictions 206. In other embodiments, the trigger 208 may be activated based on scale of fluctuations in the data input 204 or the prediction 206.

Trigger 208 can activate model challenger 210. Model challenger 210 can select a new model to replace the current model. The system can include multiple model families, such as model families 212, 222, and 232. Additionally, each model family can include multiple models, such as models 214, 216, 218, and 220 in model family 212, models 224, 226, 228, and 230 in model family 222, and models 234, 236, 238, and 240 in model family 232.

Depending on the events that activated trigger 208, model challenger can select models from the same family as the current model 202, such as from model family 212. In such circumstances, model challenger may train and test each of the models, such as models 214, 216, 218, and 220 to select a model that most accurately aligns with the data input. For example, a recent subset of the data input 204 may be withheld during training. The models 214, 216, 218, and 220 can be trained on the subset of data input 204 prior to the withheld subset. The models 214, 216, 218, and 220 can be used to predict the recent withheld subset, and the model that most accurately predicts the recent withheld subset can be selected as the new model.

Under other circumstances, trigger 208 can instruct model challenger 210 to select a new model family. Under such circumstances, model challenger 210 can select candidate models from each of the model families 212, 222, and 232, such as model 214 from family 212, model 224 from model 222, and model 234 from model 232. The candidate models can be trained and tested and a model family providing the best fit to the withheld data can be selected. Once a model family is selected, additional models from the family may be trained and tested to select a model from the family providing the best fit to the withheld data. In alternate embodiments, all models from all families can be trained and tested to select the model with the best fit rather than first testing candidate models from the model families in a first pass.

Once model challenger 210 selects a new model, the newly selected model can replace the current model 202 and the new model can be used to make an updated prediction 206.

Figure 3:
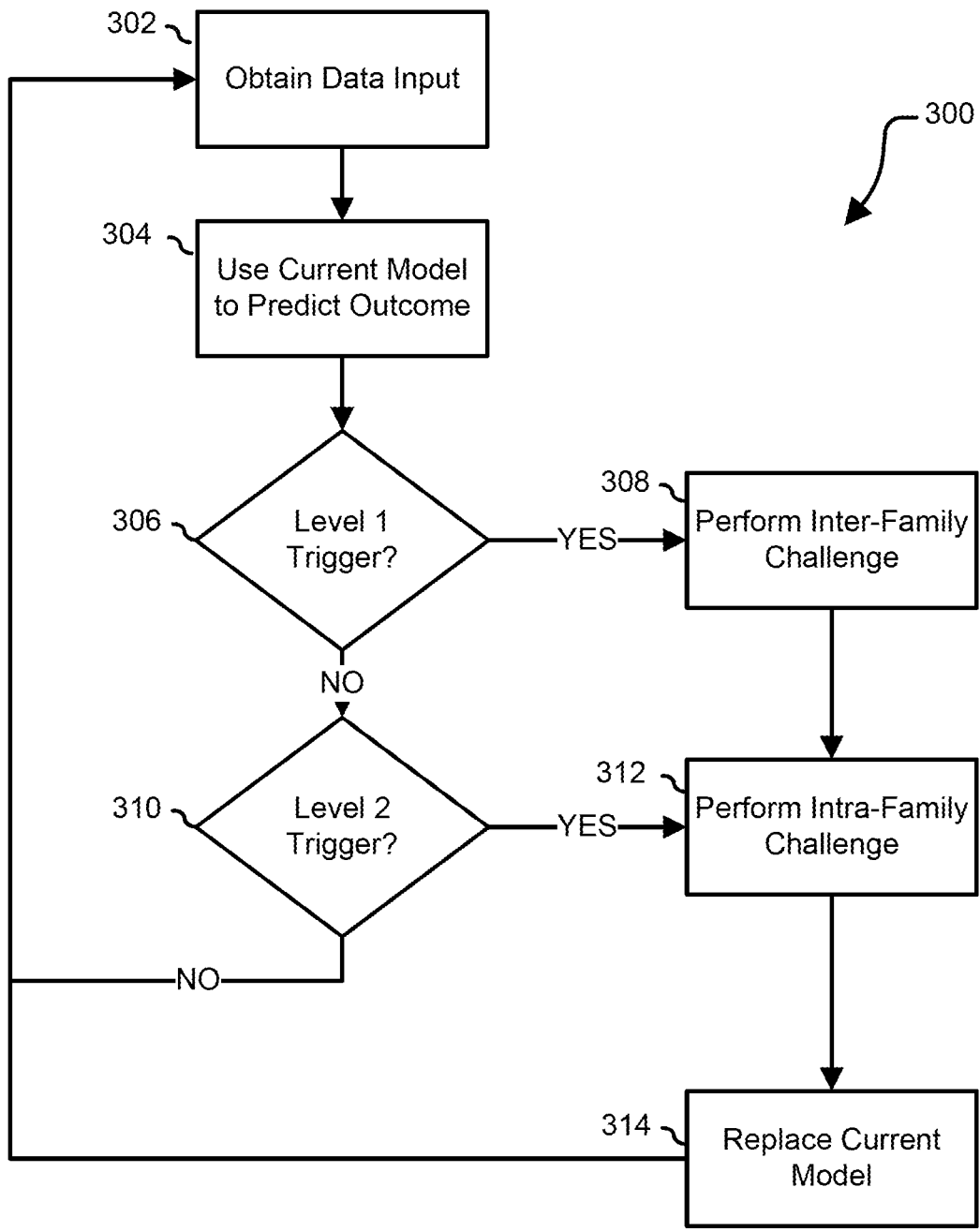
FIG. 3 is a flow diagram illustrating a method for data analytics including the automatic selection of a different model as needed, in accordance with various embodiments.

FIG. 3 shows an exemplary method 300 for data analytics and selecting a new model when warranted. At 302, the system can obtain the data input. In various embodiments, the data input can come from a data store that continuously accumulates historical sales and inventory records, customer survey results, website activity, or other information that can be useful for data analytics. At 304, the system can use a current model to predict an outcome. In various embodiments, the current model may have been trained on a subset of the data and tested against a withheld portion of the data. In other embodiments, the model may have been trained against the data previously and the prediction may be periodically or continually updated as new data becomes available.

At 306, the system can determine if a level 1 trigger should be activated. In various embodiments, a level 1 trigger can be activated when a correlation between actual and/or expected values crosses a threshold. When the level 1 trigger is active, an inter-family challenge can be initiated, as indicated at 308. An inter-family challenge can train and test models from a plurality of families to identify a family that provides an optimal prediction. In various embodiments, the optimal predication can be the prediction that provides a best fit to data, such as a test set withheld from a training set.

Returning to 306, when the level 1 trigger is not activated, the system can determine if a level 2 trigger should be activated. In various embodiments, a level 2 trigger can be activated when a scale of fluctuations of the actual or expected values or a strength of a bivariate associations crosses a threshold. When the level 2 trigger is active, an intra-family challenge can be initiated, as indicated at 312. An intra-family challenge can train and test models from a plurality of families to identify a family that provides an optimal prediction. In various embodiments, the optimal predication can be the prediction that provides a best fit to data, such as a test set withheld from a training set.

In various embodiments, the system can perform an intra-family challenge at 312 after performing an interfamily challenge at 308 to select an optimal model from a newly selected model family.

After the inter-family challenge at 308 or the intra-family challenge at 312, the system can replace the current model with the optimal model as determined by the inter-family challenge and/or the intra-family challenge, as indicated at 314. The system can then return to 302 to obtain additional input data. Alternatively, returning to 310, if a level 2 trigger is not activated, the system can return to 302 to obtain additional input data.

In various embodiments, the replacement model can be used to forecast the data periodically, such as with a fixed interval. For example, the forecast can be determined hourly, daily, weekly, monthly, quarterly, etc. In various embodiments, a quality score can be calculated for each time the forecast is performed, and the quality score can be tracked over time to give an indication in changes to how accurately the model is forecasting future data.

In various embodiments, the disclosed system can be used for analyzing and forecasting inventory. Inventory forecasts can be useful for ordering additional product, rebalancing inventory between regions and warehouses, and making decisions on price reductions, discounts, bundles, and the like.

In various embodiments, the system can gather information, such as customer survey data, current inventory data, foreign exchange rates, product life cycles, product types and classes, product build rates, shipping times between regions and between manufacturing and warehousing, sales forecasts, regions where the inventory is stored and sold, and the like. This information can be used to train and evaluate various models or model families to forecast an expected inventory. The forecast can include which warehouses and which regions hold the inventory and may identify any situations when a region has insufficient inventory to fulfill orders or when a region has excess inventory to satisfy sales forecasts for the next sales period.

In various embodiments, the system can trigger an inter-family challenge (level 1 trigger) when an auto-correlation of inventory volumes crosses a threshold. The correlated inventory volumes can include inventory volumes from a present period and a preceding period, using expected inventory values for the present period when training and testing a model or actual inventory values for the present period. The system can further trigger an inter-family challenge when a lagged correlation between inventory volumes (expected or actual) or other variables crosses a threshold.

In various embodiments, the system can trigger an intra-family challenge (level 2 trigger) when a scale of fluctuations or a variation of inventory volume (actual or expected) crosses a threshold. In this situation, an intra-family challenge may be useful to adjust smoothing parameters. Another level 2 trigger can include when an estimation of strength or nature of a bivariate association, such as between an actual inventory and an exchange rate, crosses a threshold. In this situation, an intra-family challenge may be useful to determine if variable transformation is necessary. Yet another level 2 trigger can include correlations among inventory volumes (actual or expected) and other predictors crossing a threshold. A further level 2 trigger can include rank thresholds for correlations crossing a threshold, which may be useful to separate influential variables from insignificant variables.

In various embodiments, the disclosed system can be used for analyzing and forecasting product sales, either as a number of unit expected to be sold or as an amount of revenue generated from the sales. Sales forecasts can be useful for ensuring appropriate amounts of parts and/or products have been ordered or are on hand, making decisions on price reductions, discounts, bundles, and the like, making changes to product pricing, or similar decisions to ensure customers orders can be fulfilled in a timely manner. Additionally, accurate sales forecasts can be useful for management when giving corporate guidance, setting company goals, or determining if new sales or marketing strategies are working (comparing forecast sales without the new strategy with actual sales with the new strategy).

In various embodiments, the system can gather information, such as customer survey data, foreign exchange rates, product life cycles, product types and classes, current or planned promotions (including sales, discounts, and bundles), regional sales, and the like. This information can be used to train and evaluate various models or model families to forecast expected sales. The forecast can include sales, such as total sales, sales by region, and the like, and may identify any situations when sales are declining in a region or for a product, when additional products should be introduced to boost sales, when additional promotions should start or existing promotions should end.

In various embodiments, the system can trigger an inter-family challenge (level 1 trigger) when an auto-correlation of sales volumes crosses a threshold. The correlated sales volumes can include sales volumes from a present period and a preceding period, using expected sales for the present period when training and testing a model or actual sales for the present period. The system can further trigger an inter-family challenge when a lagged correlation between sales volumes (expected or actual) or other variables crosses a threshold.

In various embodiments, the system can trigger an intra-family challenge (level 2 trigger) when a scale of fluctuations or a variation of sales volume (actual or expected) crosses a threshold. In this situation, an intra-family challenge may be useful to adjust smoothing parameters. Another level 2 trigger can include when an estimation of strength or nature of a bivariate association, such as between an actual sales and an exchange rate, crosses a threshold. Yet another level 2 trigger can be activated when correlations among sales volumes (actual or expected) and other predictors cross a threshold or when rank thresholds for correlations cross a threshold, which may be useful to separate influential variables from insignificant variables.

In various embodiments, online storefronts and targeted advertising campaigns (such as by email, web, or the like) can rely upon accurately forecasting a customers purchasing habits and product interest. The disclosed system can be used for analyzing and forecasting customer purchases to guide in the recommendations of products of interest or individualized sales bundles to spur purchases of products. Forecasting customer purchases and interests can be useful for providing recommendations to customers, customizing product recommendations, gaging customer interest in potential new products, upselling and cross-selling products, and the like.

In various embodiments, the system can gather information, such as customer survey data, customer purchase history, customer browse history, customer transaction categories (new versus used products and trading in of old products with the purchase of a replacement product) and the like. This information can be used to train and evaluate various models or model families to forecast customer interests and purchasing patterns. The forecast can include what a customer may be interested in buying, when a customer may make a purchase, and the effect of various promotions and recommendations on the customer's decision to purchase a upgraded or higher end product or purchase additional goods along with an expected purchase.

In various embodiments, the system can trigger an inter-family challenge (level 1 trigger) or an intra-family challenge (level 2 trigger) when there is a shift in a customer purchase pattern, such as unexpected purchases or altered purchase timing.

In various embodiments, the disclosed system can be used for generating dynamic surveys. Dynamic surveys can be useful for to obtain information about customer experiences, gauge market interest in a product or service, and the like. While traditional surveys can provide a customer with a long list of questions and take a significant time for the customer to complete, a dynamic survey can adapt future questions to particular customer segments and reduce overall time spent by the customer in completing the survey.

In various embodiments, the system can gather information, such as customer survey data from a plurality of individuals who have taken this and prior surveys, answers to previous questions (either in the present survey or prior surveys) by the individual taking the survey, available questions in a question pool, and the like. This information can be used to train and evaluate various models or model families to forecast an customer interest. The forecast can be used to select future questions in the present survey, decide on future product development, decide on future promotions, sales, and bundles, or to decide on or to formulate marketing strategies.

In various embodiments, the system can trigger an inter-family challenge (level 1 trigger) or an intra-family challenge (level 2 trigger) when a correlation between expected and actual answers, such as based on a strength of the association) crosses a threshold, or when a response pattern indicator crosses a threshold. The response pattern indicator can be based on answers to successive questions and an individual's propensity to provide particular responses.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for inventory forecasting, the method comprising:
    obtaining input data from a data store, the input data including customer survey data, current inventory data, foreign exchange rates, product life cycles, product types and classes, product build rates, shipping times between regions and between manufacturing and warehousing, sales forecasts, regions where the inventory is stored and sold, or any combination thereof;
    using a processor to forecast future inventory levels with a currently selected model;
    detecting a trigger event using a processor that accesses a computer memory of the data store to obtain continuously accumulated data as the input data, the trigger event including a level 1 trigger event or a level 2 trigger event, the level 1 trigger event including an auto-correlation of inventory volumes crossing a threshold, a lagged correlation with inventory volumes crossing a threshold, or any combination thereof, the level 2 trigger event including a variation of inventory volume crossing a threshold, an estimation of strength or nature of a bivariate association crossing a threshold, or any combination thereof;
    withholding a subset of the input data during training of alternative models;
    using a processor to train the alternative models on the input data without the withheld subset of the input data in response to detecting the trigger event, wherein the alternative models can be in the same model family in response to the trigger event is a level 1 trigger event or from multiple different model families in response to the trigger event is a level 2 trigger event;
    determining whether a scale of fluctuations of actual or expected values within the training of the alternative models crosses a threshold;
    in response to the scale of fluctuations of the actual or the expected values within the training of the alternative models crossing the threshold, detecting that the trigger event is the level 2 trigger event;
    using an intra-family challenge to train and test models to identify a family of models, the replacement model having a best fit to predict the withheld subset of the input data;
    using the processor to forecast future inventory levels with the replacement model and provide the inventory forecast; and
    replacing the current model with the replacement model such that future inventory forecasts are performed using the replacement model.

2. The method of claim 1, wherein the best fit is based on an error rate, an operational reliability over time, or any combination thereof.

3. The method of claim 1, further comprising using a processor to forecast future inventory levels with the replacement model a plurality of times at a fixed interval.

4. The method of claim 3, further comprising providing a model quality score as a function of time from the plurality of times.

5. The method of claim 1, further comprising adjusting supply orders based on the forecast.

6. The method of claim 1, further comprising rebalancing inventory across multiple regions or warehouses based on the forecast.

7. The method of claim 1, further comprising modifying a promotion based on the forecast.

8. A method for sales forecasting:
    obtaining input data from a data store, the input data including customer survey data, foreign exchange rates, product life cycles, product types and classes, current or planned promotions, regional sales, or any combination thereof;
    using a processor to forecast future sales levels using a currently selected model;
    detecting a trigger event using a processor that accesses a computer memory of the data store to obtain continuously accumulated data as the input data, the trigger event including a level 1 trigger event or a level 2 trigger event, the level 1 trigger event including an auto-correlation of sales volumes crossing a threshold, a lagged correlation with sales volumes crossing a threshold, or any combination thereof, and the level 2 trigger event including a variation of sales volume crossing a threshold, an estimation of strength or nature of a bivariate association crossing a threshold, or any combination thereof;
    withholding a subset of the input data during training of alternative models;
    using a processor to train the alternative models on the input data without the withheld subset of the input data in response to detecting the trigger event, wherein the alternative models can be in the same model family in response to the trigger event is a level 1 trigger event or from multiple different model families in response to the trigger event is a level 2 trigger event;
    determining whether a scale of fluctuations of actual or expected values within the training of the alternative models crosses a threshold;
    in response to the scale of fluctuations of the actual or the expected values within the training of the alternative models crossing the threshold, detecting that the trigger event is the level 2 trigger event;
    using an intra-family challenge to train and test models to identify a family of models, the replacement model having a best fit to predict the withheld subset of the input data;

forecasting future sales volumes using the replacement model and providing the sales forecast; and replacing the current model with the replacement model such that future sales forecasts are performed using the replacement model.

9. The method of claim 8, wherein the best fit is based on an error rate, an operational reliability over time, or any combination thereof.

10. The method of claim 8, further comprising using a processor to forecast future sales levels with the replacement model a plurality of times at a fixed interval.

11. The method of claim 10, further comprising providing a model quality score as a function of time from the plurality of times.

12. The method of claim 8, further comprising changing a product pricing based on the forecast.

13. The method of claim 8, further comprising modifying a sales target or guidance based on the forecast.

14. The method of claim 8, further comprising modifying a promotion based on the forecast.

* * * * *